(12) United States Patent
Raucoulles et al.

(10) Patent No.: US 11,685,302 B2
(45) Date of Patent: Jun. 27, 2023

(54) TRUCK-MOUNTABLE DETECTION SYSTEM

(71) Applicant: GUIMA PALFINGER S.A.S., Caussade (FR)

(72) Inventors: Michel Raucoulles, Realville (FR); Guillaume Bourdais, Montauban (FR); Mario Roither, Salzburg (FR); Alexander Baumgartner, Thalgau (AT)

(73) Assignee: GUIMA PALFINGER S.A.S., Caussade (FR)

( * ) Notice: Subject to any disclaimer, the term of this patent is extended or adjusted under 35 U.S.C. 154(b) by 249 days.

(21) Appl. No.: 16/891,359

(22) Filed: Jun. 3, 2020

(65) Prior Publication Data

US 2020/0290496 A1 Sep. 17, 2020

Related U.S. Application Data

(63) Continuation of application No. PCT/EP2018/082406, filed on Nov. 23, 2018.

(30) Foreign Application Priority Data

Dec. 5, 2017 (EP) .................................. 17205429

(51) Int. Cl.
*B60P 1/64* (2006.01)
*H04N 13/239* (2018.01)
(Continued)

(52) U.S. Cl.
CPC ............ *B60P 1/649* (2013.01); *H04N 13/239* (2018.05); *B60P 1/6463* (2013.01); *B60R 11/04* (2013.01);
(Continued)

(58) Field of Classification Search
CPC ........ B25J 9/1697; B25J 19/023; B25J 9/162; B25J 5/007; B66F 9/12; B66F 11/046;
(Continued)

(56) References Cited

U.S. PATENT DOCUMENTS

| 4,575,304 A | * | 3/1986 | Nakagawa | G06T 1/0014 |
| | | | | 414/730 |
| 5,915,905 A | * | 6/1999 | Hopland | B63B 27/16 |
| | | | | 414/137.4 |

(Continued)

FOREIGN PATENT DOCUMENTS

| DE | 102010006323 | 8/2011 |
| EP | 3 153 348 | 4/2017 |

(Continued)

OTHER PUBLICATIONS

Observations by a third party issued Jul. 11, 2019 in corresponding European Patent Application No. 117205429.8.
(Continued)

*Primary Examiner* — Daniel Chang
(74) *Attorney, Agent, or Firm* — Wenderoth, Lind & Ponack, L.L.P.

(57) ABSTRACT

A truck-mountable detection system for detection of a first coupling device of a container, in which the first coupling device is configured for coupling with a second coupling device of a truck-mounted loading equipment, in particular a hook of a hookloader. The detection system includes a data processor and an data capturing device, the data of which can be sent to the data processor. The data capturing device is a stereographic sensor system, and the data processor is configured to automatically recognize the shape of the first coupling device of the container based on the data provided by the stereographic sensor system.

27 Claims, 4 Drawing Sheets

(51) Int. Cl.
*B60R 11/04* (2006.01)
*G03B 35/08* (2021.01)
*H04N 13/00* (2018.01)

(52) U.S. Cl.
CPC ...... *G03B 35/08* (2013.01); *H04N 2013/0074* (2013.01)

(58) Field of Classification Search
CPC . G06T 2207/10028; G06T 7/74; G06T 7/593; G06T 7/70; G06T 2200/04; G06T 2207/30252; H04N 7/185
See application file for complete search history.

(56) References Cited

U.S. PATENT DOCUMENTS

| | | | |
|---|---|---|---|
| 6,328,523 B1 * | 12/2001 | Watanabe | B25J 9/1697 414/811 |
| 6,765,607 B2 | 7/2004 | Mizusawa et al. | |
| 7,006,127 B2 | 2/2006 | Mizusawa et al. | |
| 8,908,913 B2 * | 12/2014 | Taguchi | G06T 7/75 382/103 |
| 8,915,692 B2 * | 12/2014 | Grinnell | B60L 15/38 414/551 |
| 8,998,555 B1 * | 4/2015 | Ingham | B65F 3/0203 414/408 |
| 9,227,323 B1 * | 1/2016 | Konolige | H04N 5/33 |
| 9,300,954 B2 | 3/2016 | Tanizumi et al. | |
| 9,333,649 B1 * | 5/2016 | Bradski | B25J 19/00 |
| 9,452,531 B2 * | 9/2016 | Kikkeri | B25J 9/1676 |
| 9,908,696 B1 * | 3/2018 | Zevenbergen | G06Q 10/087 |
| 2002/0145662 A1 | 10/2002 | Mizusawa et al. | |
| 2002/0145663 A1 | 10/2002 | Mizusawa et al. | |
| 2006/0092403 A1 * | 5/2006 | Dralle | G06V 20/10 356/71 |
| 2007/0127816 A1 * | 6/2007 | Balslev | G06T 7/12 382/181 |
| 2007/0140821 A1 * | 6/2007 | Garon | B25J 9/0084 414/730 |
| 2011/0157178 A1 * | 6/2011 | Tuzel | G06T 7/586 345/426 |
| 2015/0219451 A1 * | 8/2015 | Pettersson | G01S 17/42 33/503 |
| 2015/0249821 A1 | 9/2015 | Tanizumi et al. | |
| 2015/0298621 A1 * | 10/2015 | Katoh | B60R 11/04 348/148 |
| 2015/0331536 A1 * | 11/2015 | Miyakawa | G06F 3/04186 345/173 |
| 2015/0352719 A1 * | 12/2015 | Nakazato | G05B 19/4183 700/253 |
| 2015/0360882 A1 * | 12/2015 | Girtman | B25J 11/00 414/796.5 |
| 2016/0098841 A1 * | 4/2016 | Sekiguchi | G06T 7/529 382/106 |
| 2016/0177540 A1 * | 6/2016 | Penza | E02F 3/96 296/24.32 |
| 2017/0068756 A1 * | 3/2017 | Wilsher | G06F 30/15 |
| 2017/0124714 A1 * | 5/2017 | Sridhar | G01B 11/2545 |
| 2017/0200048 A1 * | 7/2017 | Yamada | G01C 21/3874 |
| 2018/0081368 A1 | 3/2018 | Watanabe et al. | |
| 2019/0176326 A1 * | 6/2019 | Bingham | B25J 9/161 |
| 2019/0272411 A1 * | 9/2019 | Zou | G06T 7/10 |
| 2019/0302764 A1 * | 10/2019 | Smith | B62D 53/125 |

FOREIGN PATENT DOCUMENTS

| | | | | |
|---|---|---|---|---|
| EP | 3153348 A1 * | 4/2017 | | B60P 1/00 |
| JP | 2002-308029 | 10/2002 | | |
| JP | 2002-312768 | 10/2002 | | |
| JP | 2016/024685 | 2/2016 | | |
| JP | 2016/203836 | 12/2016 | | |
| JP | 2017-76833 | 4/2017 | | |
| JP | 2017-81536 | 5/2017 | | |
| WO | WO-9217287 A2 * | 10/1992 | | B07C 5/126 |
| WO | 2017/108764 | 6/2017 | | |
| WO | WO-2017108764 A1 * | 6/2017 | | B60P 1/6427 |

OTHER PUBLICATIONS

"Rugged Inductive Sensors Detect Position of Demountable Container on Hooklift Trucks", Contrinex, Apr. 19, 2016, https://www.valinonline.com/blog/contrinex/rugged-inductive-sensors.

International Search Report dated Jan. 23, 2019 in International (PCT) Application No. PCT/EP2018/082406.

Observations by a third party issued Jun. 26, 2020 in corresponding European Patent Application No. 17205429.8.

* cited by examiner

TRUCK-MOUNTABLE DETECTION SYSTEM

BACKGROUND OF THE INVENTION

The invention concerns a truck-mountable detection system and a truck-mountable loading equipment and a truck having such a detection system.

The position of the first coupling device of a container (e.g. eyelet being formed by a hookbar or the like on the outside of at least one wall of the container) relative to the container itself is usually defined by local container standards. Also, the shapes and designs of the first coupling device are often standardized. However, due to different placements of the container or the truck-mounted loading equipment the position of the first coupling device relative to a second coupling device of the loading equipment varies. Because of this, a driver or operator of the truck has to move the second coupling device into the correct position, in particular a height of the second coupling device has to be chosen correctly. The distance between the driver who is sitting in a cabin of the truck and the container is quite large. Therefore, it is not always easy to set the position of the second coupling device correctly. This is especially a problem for unskilled drivers.

This problem arises in particular with respect to loading equipments of the hookloader type the arms of which can only be moved relative to the truck they are mounted on in a single (vertical) plane. So-called telescopic hookloaders have an additional degree of freedom provided by the possibility to extend and retract at least one of the arms with respect to another arm. There are also other types of hookloaders such as articulated hookloaders. The invention is not restricted to any type of hookloader.

Current loading equipments of the applicant are already equipped with an electronic control system which provides safety monitoring of the loading equipment as well as an automatic operation mode, which allows an operator to load, tip or unload a container in an automatically triggered sequence of functions. However, the position of the first coupling device of the container has to be detected by the operator.

EP 3 153 348 A1 and WO 2017/108764 A1 disclose detection systems, truck-mountable loading equipments and trucks having such detection systems which use one or more cameras.

EP 3 153 348 A1 describes that the position of the first coupling device of the container can be identified automatically using markers arranged on the container together with the data provided by the camera (cf. paragraph 40). The operations of exchange, loading, unloading and/or discharging of the interchangeable container can be done in an automatic way (cf. paragraph 41). No details as to how this would be accomplished are given.

WO 2017/108764 A1 describes a method for providing guidance for the alignment of the second coupling device of a loading equipment and a first coupling device of a container. The method comprises capturing an image which includes the second coupling device using a data capturing device (e.g. one or more cameras) fixed with respect to the truck and laterally offset with respect to the first coupling device and displaying the image together with a coupling alignment guide by way of an augmented reality display. The systems use markers arranged on the container. The system could be operated in an entirely automatic or in a semi-automatic way.

The methods of the prior art can only be practiced with respect to special containers that are provided with markers identifying the position of the first coupling device.

SUMMARY OF THE INVENTION

The purpose of the invention is to provide a truck-mountable detection system and a truck-mountable loading equipment and a truck having such a detection system which can be used together with commonly used (unmarked) containers.

This is achieved by a truck-mountable detection system as described below and a truck-mountable loading equipment and a truck having such a detection system and loading equipment.

The use of a stereographic sensor system as the data capturing device and of a data processor which is configured to automatically recognize the shape of the first coupling device of the container based on the data provided by the stereographic sensor system ensures that no markers have to be arranged on containers in order to enable the automatic recognition of the position of the first coupling device. It can be provided that the data processor is configured to calculate a position of the automatically recognized first coupling device. It is not absolutely necessary to calculate the position of the first coupling device, e.g. it could be sufficient to move the second coupling device such that it approaches the automatically recognized first coupling device.

Preferably, the stereographic sensor system can be a stereographic camera system, preferably a stereographic camera system working in the visible spectrum. The stereographic sensor system can comprise at least two sensors (e.g. cameras) looking at the same field of detection to provide 3D information. The at least two sensors can be arranged in a common housing or in separate housings. The at least two sensors can be provided in the form of two different cameras or in the form of two objectives of a single camera.

The container can be of any type suitable for holding load or can be a load itself as long as it is suitable to be handled by a loading equipment, in particular by a mobile crane or a hookloader. The container can be placed on a ground or at surface level or could be placed in an underfloor position or in an elevated position or on a trailer.

The data processor can be in the form of one or more dedicated processing unit specifically built for processing stereographic sensor system data.

The process of automatically detecting the shape of the first coupling device can be done by creating a point cloud out of the data provided by the stereographic sensor system data and comparison with pre-provided schematics and/or pictures of first coupling devices. Such a method is known in the field of image processing.

The stereographic sensor system (which could also be called "stereovision sensor system" or "stereoscopic sensor system" and must be able to provide 3D, that is to say depth, information) can be used to detect the exact position of the first coupling device of the container and of an arm or the second coupling device of the loading equipment. A control unit of the loading equipment can use this information to control, e.g. by generating or providing data for generating a series of operating commands, the height of the arm of the loading equipment in dependence on the detected position of the first coupling device of the container. More generally, the control unit of the loading equipment is configured to calculate a desired trajectory and/or an actual trajectory of a motion of the loading equipment based on the data provided by the stereographic sensor system and/or based on data provided by at least one sensor different from the stereographic sensor system.

By semiautomatic operation a way of operation is to understood where a human operator has to monitor the operation of the control unit, e.g. by continuously activating a switch (e.g. deadman-switch) in order to allow the control unit to start and continue the operation.

By automatic operation a way of operation is to be understood where an operator (human or machine) gives a start command and the following steps of the operation will be done without any further operator input.

The following additional operations can be accomplished by embodiments of the invention:
- (semi-)automatic or (semi-)autonomous coupling and/or decoupling of first and second coupling devices;
- (semi-)automatic or (semi-)autonomous adjustment of motion of arms of loading equipment and/or of motion of second coupling device;
- provide information to help operator (e.g. driver of truck) with sufficiently collinear alignment of truck and container; for this it might be necessary to detect also a shape and orientation of the container, not only the shape and position of the first coupling device;
- avoid pulling the container too far onto a loading range of the truck;
- avoid collisions of container and/or arm of loading equipment with obstacles during operations of loading equipment;
- provide documentation of operations (manipulations), e.g. by documenting time, date, driver ID, job number, etc.;
- provide safety monitoring of work area of loading equipment and/or container;
- provide information about distance between truck and container to the operator; and
- provide information to the operator in (semi-)automatic operation regarding data of the truck's operation, e.g. velocity of the truck and/or steering movement of the truck's wheels.

At least one additional sensor (e.g. optical sensor, ultrasonic sensor or other type of sensor) can be used to complement the information provided by the stereographic sensor system, e.g. with respect to information outside of a field of detection of the stereographic sensor system. This complementary information can be used by the control unit of the loading equipment in different ways as described below.

The first coupling device can be in the form of an eyelet, e.g. being formed by a hookbar or the like on the outside or edge/boundary of at least one wall of the container.

The second coupling device can be in form of a hook. This hook can be provided with a safety latch which can be operated automatically.

The loading equipment can be in form of a truck-mountable crane, in particular a mobile crane, preferably a hook-loader. In particular, the loading equipment can be a hook-loader.

A display can be provided for displaying data provided by the stereographic sensor system, preferably together with additional information regarding a loading and/or unloading process of a container. The additional information can be based on data provided by at least one additional sensor different from the stereographic sensor system. With respect to the data of the stereographic sensor system and/or with respect to the additional information this can be done by way of displaying real-life visual information, by way of renderings (virtual reality) or by way of overlaying of real-life visual information and renderings (augmented reality). For example, it is possible to show a projected position of the container in an unloaded state before and/or during unloading.

Preferably, the control unit of the loading equipment is configured to (semi-)automatically couple and/or decouple and/or load and/or unload a container by commanding movements of the loading equipment via actuators of the loading equipment. Although it is preferred that driving operations of the truck are being controlled by a driver of the truck, fully autonomous operation of the truck and the loading equipment is possible. In the latter case the control unit has to be given command over drive functions of the truck as well and additional sensors giving information about the truck will have to be used by the control unit.

Of course, it is possible that the control unit and/or the data processor is provided with an electronic memory for storage of data provided by the stereoscopic sensor system and/or additional sensors and/or relating to a configuration of the loading equipment and/or the truck and/or the container.

By way of example, the stereographic sensor system can be either mounted on or to
- at or near a rear end of the truck, or
- an arm of the loading equipment, or
- in an elevated position on the truck, e.g. on a cabin of the truck or the stereographic sensor system is mounted on a vehicle which is moveable separately from the truck.

It is possible that the container is provided with an identification mark that could be detected by the stereographic sensor system or at least one additional sensor. This identification mark is used only to provide container ID. It is not used mark the first coupling device.

It is possible to use only one of several sensors (e.g. cameras) of the stereographic sensor system to create a display of data provided by the stereographic sensor system.

If there are two or more containers placed side by side the stereographic sensor system can recognize the first coupling devices of at least two of the containers, preferably of all the containers, simultaneously. In this case the detection system is configured to be told by the operator which one of the containers is to be loaded.

BRIEF DESCRIPTION OF THE DRAWINGS

Embodiments of the invention are shown in the figures.

DETAILED DESCRIPTION OF THE INVENTION

Figure 1A:
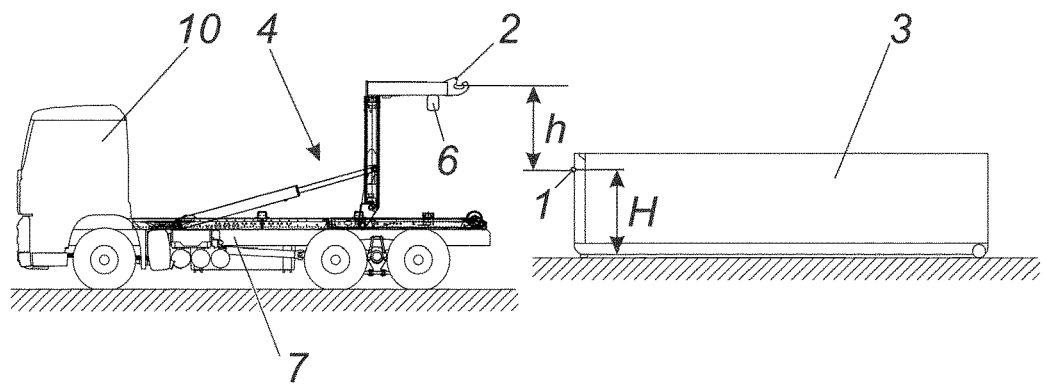
FIGS. 1a and 1b show different relative placements of the first coupling device and the second coupling device.

The figures generally show an embodiment of the invention having a loading equipment 4 in the form of a hookloader having one or two articulated arms 9 (in the figures only a single articulated arm 9 is visible) in which is slidably mounted another arm 9. The arms 9 can be moved by at least one actuator, e.g. a hydraulic piston unit. The hookloader is mounted on a truck 7. The loading operation is being accomplished by lifting the container 3 with the hookloader after establishing coupling between a first coupling device 1 arranged on the container 3 and a second coupling device 2 in the form of a hook of the hookloader. A stereographic sensor system 6 is provided.

In FIGS. 1 to 6 the stereographic sensor system 6 is arranged on an arm 9 of the loading equipment 4 adjacent to the second coupling means 2. Alternative placements are possible.

The features of the invention discussed with respect to the different figures can be used separately or in any desired combination.

Although not shown in the figures, there could be provided a security device being configured to monitor a work area of the loading equipment 4 and to give a warning if a person or an obstacle is inside or enters the work area and/or to automatically interrupt operation of the loading equipment 4.

Figure 1B:
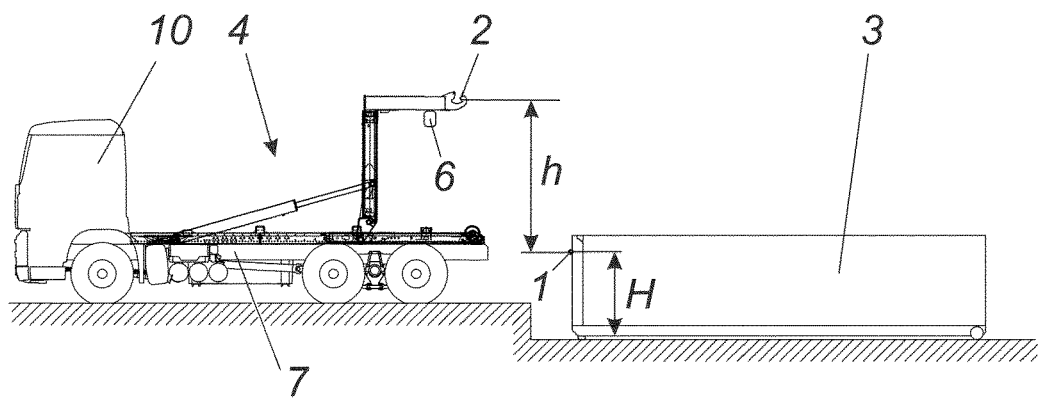

FIGS. 1a and 1b show that although the position of the first coupling device 1 of a container 3 relative to the container 3 itself (absolute height H) is defined by local container standards, due to different placements of the container 3 or the truck-mounted loading equipment 4 the position of the first coupling device 1 relative to the second coupling device 2 of the loading equipment 4 (relative height h) varies. The stereographic sensor system 6 allows detection of the position of the first coupling device 1 relative to a reference position, e.g. relative to a position of the second coupling device 2 and/or relative to a position on the container 3 itself and/or relative to a position of the stereographic sensor system 6.

Figure 2A:
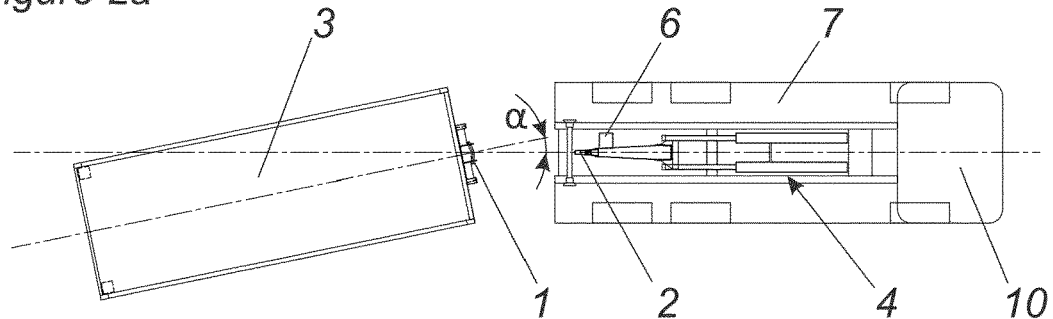
FIGS. 2a and 2b show the requirement of correct alignment of the truck and the container 3.
Figure 2B:
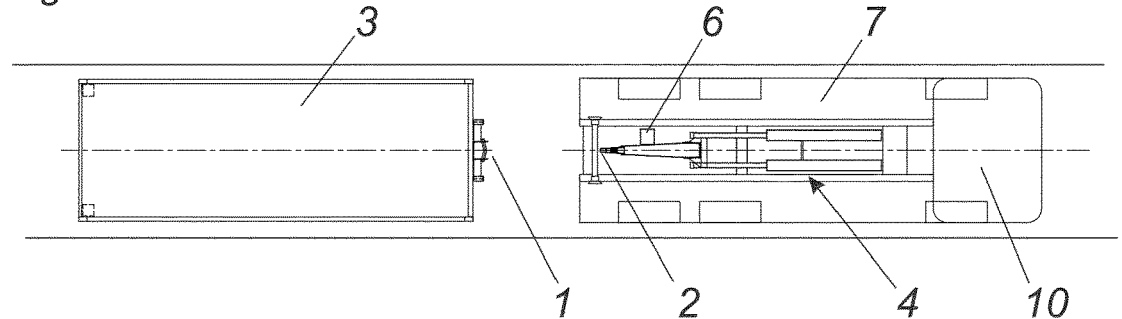

FIGS. 2a and 2b show that for a successful loading of the container 3 it is necessary to align the truck 7 sufficiently collinear to the container 3. Otherwise the container 3 cannot be lifted or may be dropped during the lifting process. This alignment can be also achieved during the first part of the loading process but at the latest at the point where the container rails are landing onto rear rollers 12 of the loading equipment 4 the collinear alignment needs to be achieved. An alignment during the first part of the loading process can be achieved by steering the truck 7 during the loading procedure, as will be explained in the following paragraph.

The truck driver positions the truck 7 in front of a container 3. Depending on the area where the container 3 is situated, sometimes it is not possible to position the truck 7 fully aligned with the container 3. The correct way of loading a container 3 with a hookloader is to pull or move the truck 7 underneath the lifted container 3, e.g. by using the force created by the hookloader. By controlling the truck steering during this operation, sufficient alignment between truck 7 and container 3 can be achieved.

In the prior art, the operator has to use the mirrors of the truck 7 to assure this aligned position. Again, this can become a challenge for unexperienced truck drivers. Furthermore, a collision can occur easily. If the misalignment angle α (FIG. 2b) is very large there is also the risk of a collision of the container 3 with parts of the truck 7 or the hookloader during the lifting movement. The stereographic sensor system 6 allows the operator to engage with the eyelet by giving information about the position and orientation of the container 3, ensuring a sufficiently collinear alignment of truck 7 and container 3 before and/or during loading.

In the following description the first coupling device 1 will, by way of example, be taken to be an eyelet.

It can be provided that a class of the container 3 can be recognized by the data processor 5 (or the control unit 11 of the loading equipment 4) by calculating the position of the first coupling device 1 in relation to a predefined reference position in the form of a predefined point on the container 3, e.g. a distance from an edge, a distance from a center point of an area, etc. This information can be used to check whether the second coupling device 2 of the hookloader is compatible for loading or coupling with the first coupling device 1. If not, a warning could be given to the operator and/or the height of the second coupling device 2 could be adjusted (semi-)automatically by the control unit 11.

It can be provided that the control unit 11 and/or the data processor 5 is/are configured to monitor a locking state of loaded container 3. For this it might be necessary to use at least one additional sensor 14.

For operations at night it can be necessary to light up the container 3 in order to provide enough light for the stereographic sensor system 6 to work. This illumination can be provided in the required spectrum, depending on the type of stereographic sensor system 6.

Figure 3:
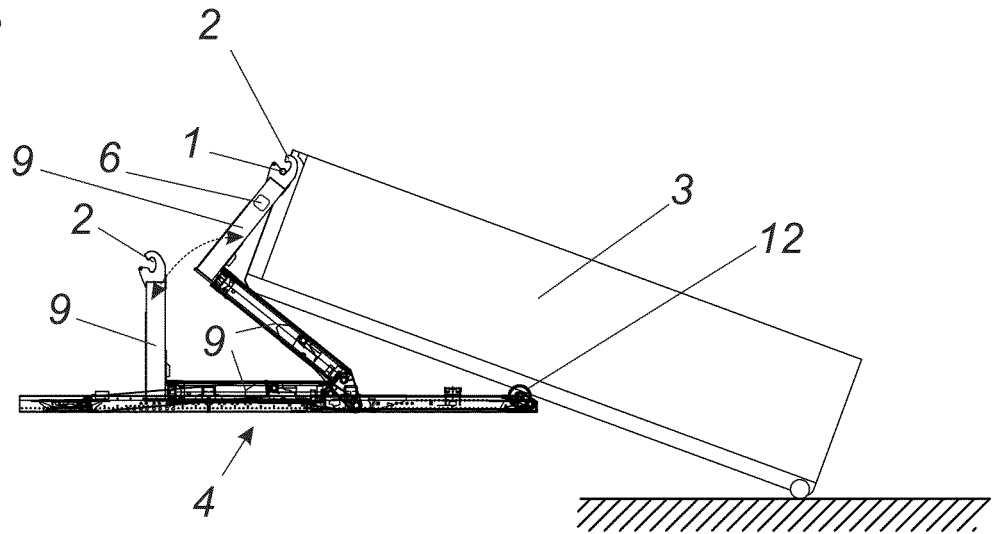
FIG. 3 shows a situation in which the container is landing on rear rollers of the loading equipment.
Figure 4:
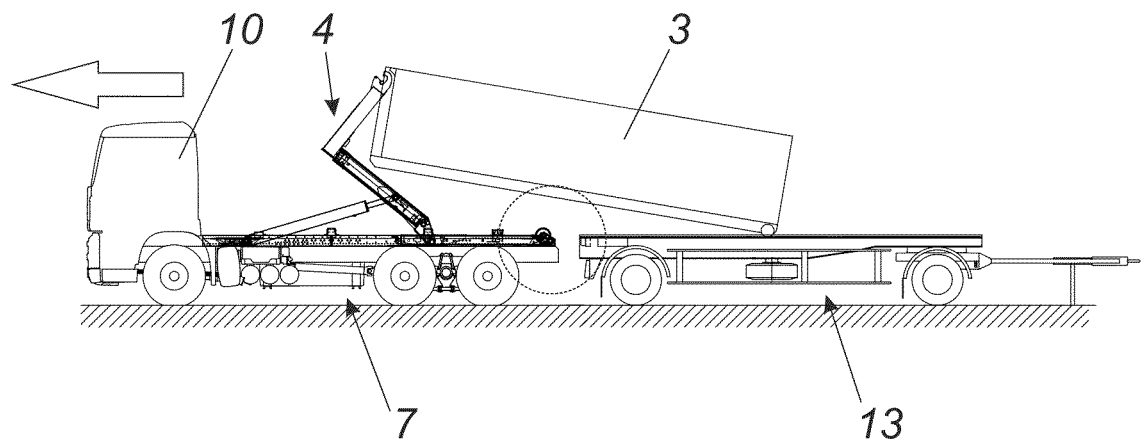
FIG. 4 shows a situation in which the container is transferred to a trailer.

At the rear end of the truck 7 (the end showing towards the container 3 before lifting) there can be provided rear rollers 12 for enabling the container 3 to be pulled onto the loading area of the truck 7 (there could be other means to decrease friction between the container 3 and the bed of the truck 7, e.g. friction-reducing glide pads). FIG. 3 shows the situation where the container 3 (more specifically the container rails arranged on the underside of the container 3) is landing on the rear rollers 12 of the hookloader. It is in the nature of hookloader containers 3 that they are produced in different lengths according to their application and customer needs. The design of so called telescopic hookloaders (having at least two arms 9 one of which is slidingly engaged with the other arm 9) provides for that fact. It allows the operator to position the hookloader as far forward towards the cabin 10 as possible but it is in the operator's responsibility not to pull the container 3 too far forward so that the container 3 would be pulled off the rear rollers 12 with its rear end. Once the container 3 passes the rear rollers 12 at the end of the loading area and rests directly on the bed of the truck 7, it cannot be unloaded by the hookloader anymore. The stereographic sensor system 6 and/or information provided by at least one additional sensor 14 can ensure that this situation does not occur.

If it is determined that a rear overhang of the container 3 is too large the control unit 11 can command automatic deployment of an underrun bumper (not shown, also called underride guard) from a rear end of the truck 7 to ensure safety and compliance with road regulations.

There are several situations where the truck 7 can collide easily with the container 3 or other objects around the loading area. The first situation described refers to the situation shown in FIGS. 1a and 1b. If the position of the hook is not exactly in the right height it will collide with another part of the container 3 if there is no distance measurement system which gives the driver information about the distance to the container. The stereographic sensor system 6 and/or information provided by at least one additional sensor 14 allows to avoid collisions during loading and unloading.

If the container 3 is not placed on the ground but is transferred to a trailer 13 (cf. FIG. 4) the truck 7 needs to get very close to the trailer 13. Here an exact distance information would be very helpful too. Furthermore, the truck 7 and the trailer 13 have to be aligned sufficiently collinear again as shown in FIGS. 2*a* and 2*b*. The stereographic sensor system 6 allows the operator to ensure a sufficiently collinear alignment of truck 7 and trailer 13.

Since a hookloader can be equipped with an articulated arm 9 there is a risk of collision between the container 3 and the rear end of the truck 7 since the position of the arm 9 with respect to the truck 7 itself can vary. There are two collision situations which can occur. The first collision situation occurs if the container 3 is pulled too close to the truck 7 and is lifted afterwards. Due to the lifting the lower edge of the container 3 moves into the direction of the truck 7 and collides with the rear end of the same. In the same way a collision situation can happen during the unloading process of the container 3, if the lower edge of the container 3 is still positioned above the truck 7 but the hook is already moving down vertically. The motivation for pulling the container 3 as close as possible over the back edge of the truck 7 stems from the desire to keep the loading angle (tip angle or inclination) of the container 3 during the loading and unloading process as small as possible. This is a requirement to avoid movement of parts or loaded goods inside the container 3. In the prior art, control unit 11 of the hookloader does not get information about the current position of the hook because there are no sensors for detecting it. Only the final positions (fully extended or fully retracted) of the hydraulic cylinders can be detected in the prior art. The stereographic sensor system 6 and/or information provided by at least one additional sensor 14 can ensure that the situations described above do not occur.

Tipping is used for unloading the content of the container 3. For this the container 3 is lifted until the content of the container 3 moves due to gravity. After tipping the container 3 the operator has to check if the container 3 is empty. The invention allows to inspect the content of the container by use of the stereographic sensor system 6. However, this function could also be provided by an additional (2D) camera.

The whole process of loading a container 3, transporting it to another location and unloading it finally again could be recorded somehow. Important information is the point or duration of time when the container 3 was manipulated, the contents of the container 3 before and after manipulation and the place where the manipulation was done (documentation of manipulation of container 3). The invention allows documentation of the whole manipulation process by use of the stereographic sensor system 6. This documentation can be saved to an electronic memory of the data processor 5 or the control unit 11 and/or could be sent via a telecommunication device to a predefined receiver (e.g. cloud).

Figure 5:
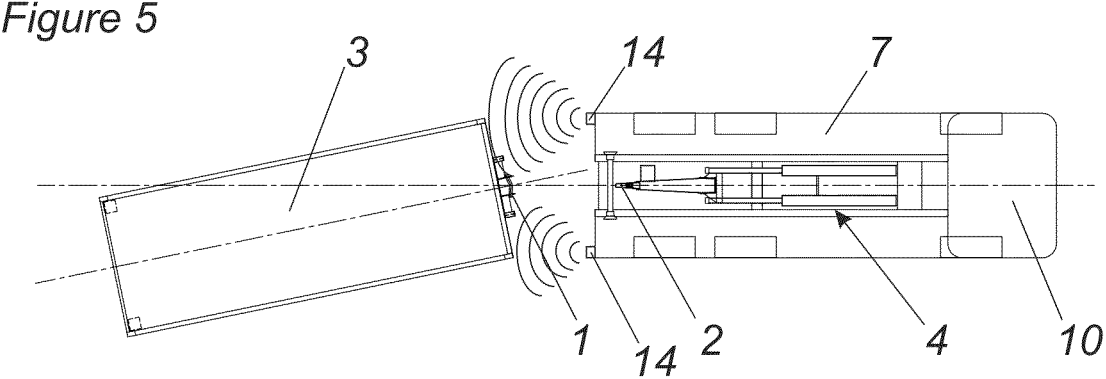
FIG. 5 shows a possible application of at least one distance sensor.

FIG. 5 shows a possible application of at least one additional sensor 14 (e.g. ultrasonic sensor) the signals of which can be transferred to the control unit 11 of the loading equipment 4. In a first application it can be detected if the container 3 is pulled too far. For this the additional sensor 14 needs to be placed at the or near the rear end of the truck 7. Preferably, additional sensor 14 is placed at a location inbetween the rear rollers 12 and the rear end of the truck 7. Once the container 3 passes the position of the additional sensor 14 the output signal allows the control unit 11 of the loading equipment 4 to detect this and give out a warning and/or stop the pulling operation of the container 3. For the second case at least one sensor 14 can be used to detect the distance from the truck 7 to the container 3. If a pair of two sensors 14 is used, information about collinear alignment of truck 7 and container 3 can be provided to the control unit 11 of the loading equipment 4.

Figure 6:
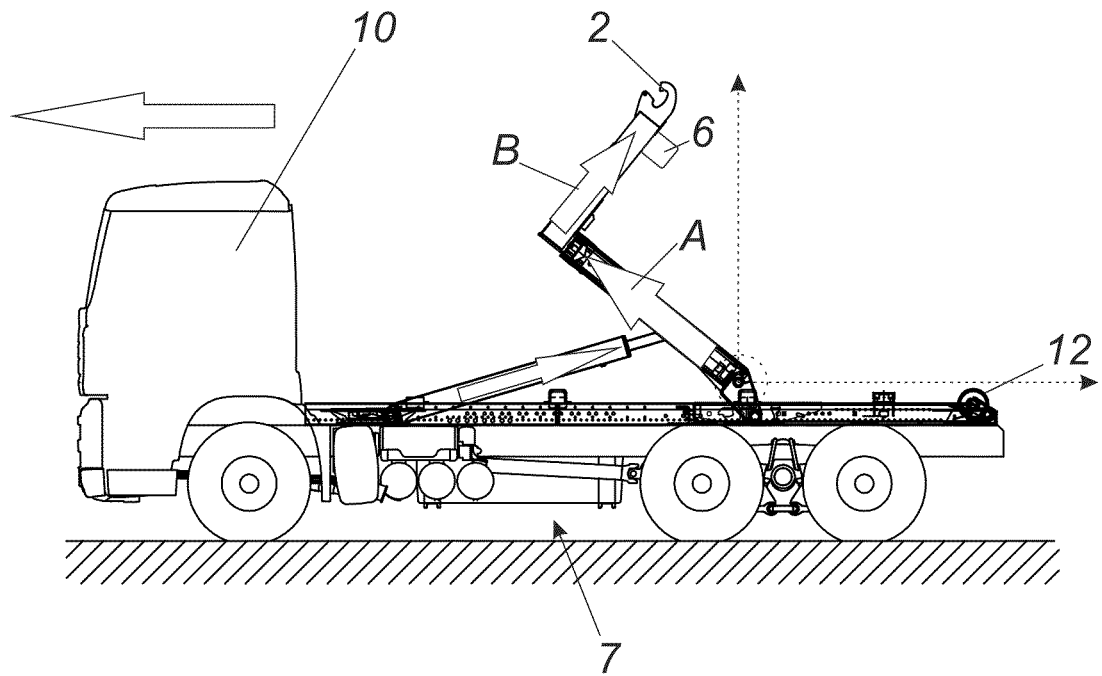
FIG. 6 shows information about the geometry of the loading equipment.

Regarding FIG. 6:

In the prior art, only the end positions (fully extended or fully retracted) of the loading equipment 4 are recognized. This can lead to problems during the loading and unloading process (e.g. collisions as discussed above). The information of the current position of the second coupling device 2 of the loading equipment 4 (e.g. hook) can be provided to the control unit 11 of the loading equipment 4 by measuring the geometry of the hookloader (the length and angles of the arms 9 and the hook of the hookloader). There is also an influence by the length and position of the container 3 which can be considered to avoid collisions at the rear of the truck 7. Furthermore, the actual position of the second coupling device 2 is a necessary information for any (semi-)autonomous function of the loading equipment 4. The stereographic sensor system 6 and/or information provided by at least one additional sensor 14 can be used for an automatic adjustment of the second coupling device 2.

Figure 7A:
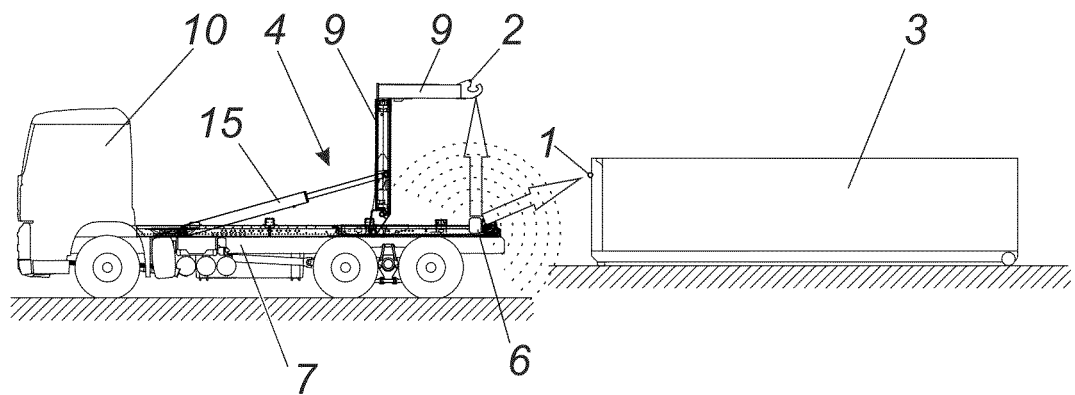
FIGS. 7a and 7b show by way of example different possibilities for placement of the stereographic sensor system.
Figure 7B:
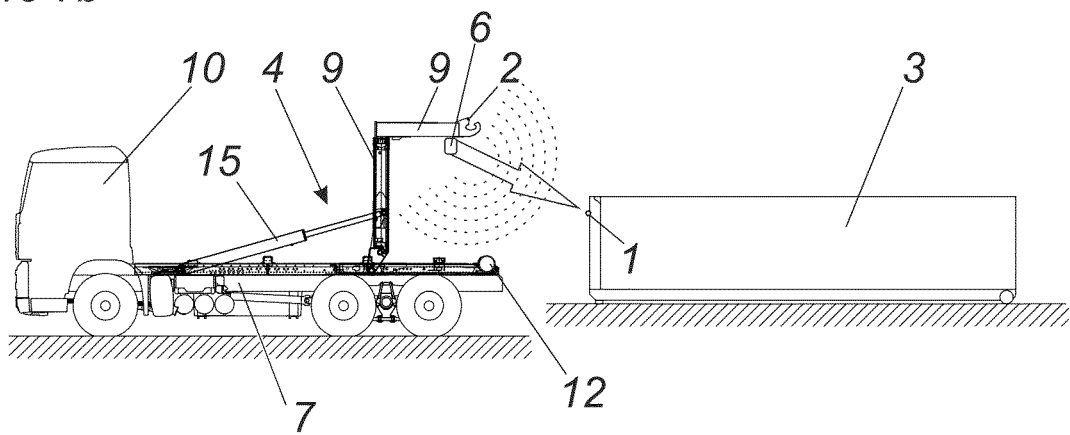

FIGS. 7*a* and 7*b* show by way of example different possibilities for placement of the stereographic sensor system 6.

For (semi-)autonomous adjusting of the loading equipment 4 the relative distance and orientation between second coupling device 2 and first coupling device 1 of the container 3 is necessary. If the stereographic sensor system 6 is placed directly on an arm 9 of the loading equipment 4 and moves together with it (cf. FIG. 7*b*), information concerning the position of the second coupling device 2 is always available. Therefore, it would be an advantage to place the stereographic sensor system 6 near the second coupling device 2. Furthermore, the elevated position of the stereographic sensor system 6 can be an advantage if the contents (or filling level) of the container 3 should be controlled as well. Also, the dimensions of the container 3 can be measured if a view from top can be provided.

On the other hand, for such a placement of the stereographic sensor system 6 additional functionalities like distance detection or collision avoidance are not possible until the second coupling device 2 is lifted. This information would then have to be provided by at least one additional sensor 14 in order to complement the information provided by the stereographic sensor system 6.

Alternative positions of the stereographic sensor system 6 can be considered. If the system is placed at or near the rear end of the truck 7 (cf. FIG. 7*a*) it always points in direction of the container 3 while an operator of the truck 7 moves the truck 7 backwards towards the container 3. In this case, the stereographic sensor system 6 can be used for the detection of the correct height of the second coupling device 2 with respect to the first coupling device 1 and/or for measuring the distance between truck 7 and container 3 and/or for enlargement of the field of detection and/or to avoid pulling the container 3 too far (past the rear rollers 12) onto a loading area of the truck 7. Such a placement can also facilitate determination of a rear overhang of the container 3.

Other than shown in FIGS. 7*a* and 7*b*, the stereographic sensor system 6 could also be placed on an elevated position on the truck 7, e.g. on a cabin 10 of the truck 7, in a position where the field of detection is sufficient.

The stereographic sensor system 6 could be placed on a mounting that can be moved relative to the truck 7 or the loading equipment 4, e.g. by changing elevation and/or angular position and/or inclination of the stereographic sensor system 6.

Figure 8:
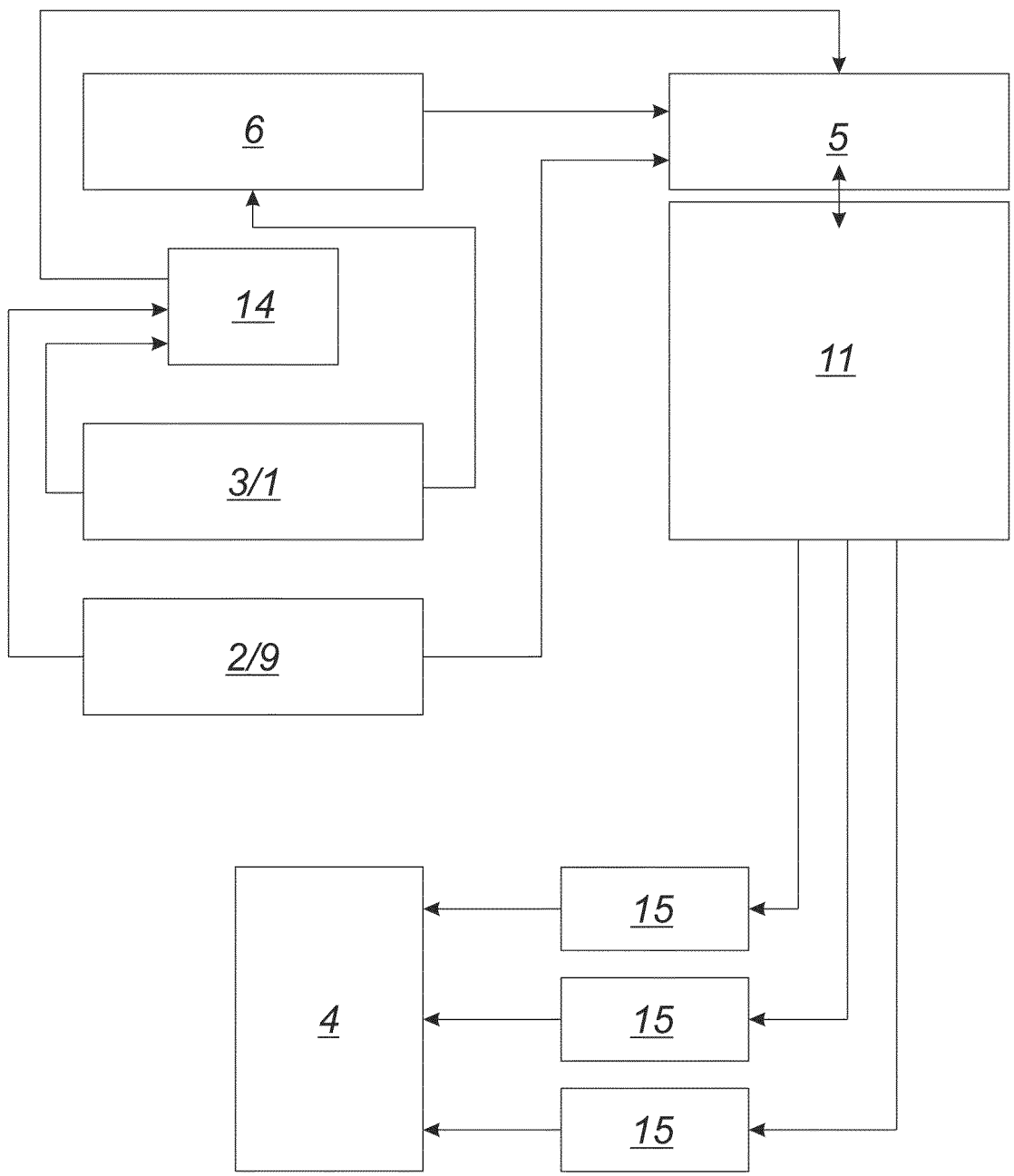
FIG. 8 shows schematically an embodiment of an loading equipment according to the invention.

FIG. 8 schematically shows an embodiment of a loading equipment 4 according to the invention. A data processor 5 receives data from the stereographic sensor system 6 and from at least one additional sensor 14 regarding a container 3 (e.g. position of first coupling device 1, length of container 3, width of container 3, height of container 3, load of container 3) and/or the second coupling device 2 and/or an arm 9 of the loading equipment 4. The data processor 5 can provide this data to a control unit 11 of the loading equipment 4 (alternatively the control unit 11 itself could comprise the data processor 5).

Depending on the position of the stereographic sensor system 6 relative to the loading equipment 4 or the truck 7, the stereographic sensor system 6 can provide the data processor 5 or the control unit 11, respectively, with information about the position of the first coupling device 1 on the container 3 and/or the position and dimensions of the container 3 and/or the position of the second coupling device 2. Based on this data, movement of the second coupling device 2 can be controlled by the control unit 11 by way of actuators 15 of the loading equipment 4, e.g. by controlling flow of hydraulic fluid and/or pressure of hydraulic fluid to and/or from at least one cylinder used to move at least one arm 9 of the loading equipment 4.

LIST OF REFERENCE SIGNS 1 first coupling device (of container)
2 second coupling device (of loading equipment)
3 container
4 loading equipment
5 data processor
6 stereographic sensor system
7 truck
8 display
9 arm of the loading equipment
10 cabin of the truck
11 control unit of loading equipment
12 rear roller
13 trailer
14 sensor
15 actuator of loading equipment

The invention claimed is:

1. A truck-mountable detection system for detection of a first coupling device of a container, the first coupling device being an eyelet or a hookbar, the eyelet or hookbar being provided on an outside of a wall of the container or on an edge or a boundary of the wall of the container, the first coupling device being configured for coupling with a second coupling device of a truck-mounted loading equipment, the detection system comprising a data processor and a data capturing device capturing data of which can be sent to the data processor, wherein the data capturing device is a stereographic sensor system configured to provide depth information, and the data processor is configured to automatically recognize a three-dimensional shape and a position of the first coupling device of the container based on the depth information provided by the stereographic sensor system.

2. The truck-mountable detection system according to claim 1, wherein the stereographic sensor system comprises at least two sensors looking at a same field of detection.

3. The truck-mountable detection system according to claim 1, wherein the position of the automatically recognized first coupling device is calculated.

4. The truck-mountable detection system according to claim 1, wherein the data processor is configured to check whether the second coupling device is compatible for coupling and loading with the first coupling device based on the data provided by the stereographic sensor system.

5. The truck-mountable detection system according to claim 1, wherein a class of the container can be recognized by the data processor by calculating the position of the first coupling device in relation to a predefined reference position in the form of a predefined point on the container.

6. A truck-mountable loading equipment, comprising:
the truck-mountable detection system according to claim 1, and
the second coupling device which is configured for coupling with the first coupling device of the container, wherein the data processor of the detection system is implemented by a control unit of the loading equipment or is connected to a control unit of the loading equipment.

7. The truck-mountable loading equipment according to claim 6, wherein the control unit of the loading equipment is configured to calculate a desired trajectory or an actual trajectory of a motion of the loading equipment based on the data provided by the stereographic sensor system or based on data provided by at least one sensor different from the stereographic sensor system.

8. The truck-mountable loading equipment according to claim 6, wherein the control unit of the loading equipment is configured to automatically compute the position of the container relative to the loading equipment based on the depth information provided by the stereographic sensor system or based on data provided by at least one sensor different from the stereographic sensor system.

9. The truck-mountable loading equipment according to claim 6, wherein the control unit of the loading equipment is configured to automatically detect a shape of the container based on the depth information provided by the stereographic sensor system.

10. The truck-mountable loading equipment according to claim 6, wherein the control unit of the loading equipment is configured to give information about alignment of a truck or a trailer or the container to an operator of the loading equipment based on the data provided by the stereographic sensor system or based on data provided by at least one sensor different from the stereographic sensor system before or during loading.

11. The truck-mountable loading equipment according to claim 6, wherein the control unit of the loading equipment is configured to automatically determine a rear end position of the container and to detect if the container is shorter than a loading area of a truck or if the container is longer than the loading area of the truck based on the data provided by the stereographic sensor system or based on data provided by at least one sensor different from the stereographic sensor system.

12. The truck-mountable loading equipment according to claim 6, wherein the control unit of the loading equipment is configured to automatically couple or decouple the second coupling device of the container and the first coupling device of the loading equipment based on the position of the first coupling device calculated by the detection system, and wherein the control unit automatically or semi-automatically commands movements of the loading equipment for the automatic coupling or decoupling.

13. The truck-mountable loading equipment according to claim 6, wherein the control unit of the loading equipment is configured to automatically or semi-automatically load or automatically or semi-automatically unload the container by commanding movements of the loading equipment based on the data provided by the stereographic sensor system and/or based on data provided by at least one sensor different from the stereographic sensor system.

14. The truck-mountable loading equipment according to claim 6, further comprising a security device configured to monitor a work area of the loading equipment and to give a warning if a person or an obstacle is inside or enters the work area or to automatically interrupt operation of the loading equipment if the person or the obstacle is inside or enters the work area.

15. The truck-mountable loading equipment according to claim 6, further comprising a display for displaying data provided by the stereographic sensor system.

16. The truck-mountable loading equipment according to claim 6, wherein the loading equipment is a hookloader equipped with an articulated arm.

17. A truck comprising:
the truck-mountable detection system according to claim 1; and
a loading equipment having the second coupling device configured for coupling with the first coupling device of the container.

18. The truck according to claim 17, wherein the stereographic sensor system is either mounted on or to:
at or near a rear end of the truck; or
an arm of the loading equipment; or
in an elevated position on the truck; or
the stereographic sensor system is mounted on a vehicle which is moveable separately from the truck.

19. The truck-mountable detection system according to claim 1, wherein the second coupling device is a hook of a hookloader.

20. The truck-mountable detection system according to claim 2, wherein the at least two sensors comprise at least two cameras.

21. The truck-mountable loading equipment according to claim 6, wherein the loading equipment is a hookloader.

22. The truck-mountable loading equipment according to claim 11, wherein the control unit of the loading equipment is configured to automatically deploy an underrun bumper upon detecting that the container is longer than the loading area of the truck.

23. The truck-mountable loading equipment according to claim 13, wherein the control unit of the loading equipment is configured to automatically or semi-automatically load the container onto a truck or automatically or semi-automatically unload the container from the truck by commanding the movements of the loading equipment while driving operations of the truck are being controlled by a driver of the truck.

24. The truck-mountable loading equipment according to claim 15, wherein the display is configured to display additional information regarding a loading or unloading process of the container provided by at least one additional sensor together with the data provided by the stereographic sensor system.

25. The truck-mountable loading equipment according to claim 6, wherein the loading equipment is a telescopic hookloader.

26. The truck according to claim 17, wherein the loading equipment is a hookloader.

27. The truck according to claim 18, wherein the stereographic sensor system is either mounted on or to an elevated position on a cabin of the truck.

* * * * *